United States Patent [19]

Berglöff et al.

[11] 4,270,254
[45] Jun. 2, 1981

[54] METHOD FOR MAKING GROOVED ROLLERS FOR DEHYDRATING RUNS OF MATERIALS

[75] Inventors: Dag Berglöff; Alois Wohlfarter; Otto Heissenberger; Martin Mühlhauser, all of Graz; Franz Petschauer, Lannach, all of Austria

[73] Assignee: Anstalt für Strömungsmaschinen Gesellschaft mbH, Austria

[21] Appl. No.: 33,703

[22] Filed: Apr. 26, 1979

[51] Int. Cl.³ .................. B21D 53/12; B21H 1/12; B21K 1/02
[52] U.S. Cl. ........................ 29/148.4 D; 29/452; 29/456; 29/525; 29/127
[58] Field of Search ............ 29/456, 452, 127, 128, 29/148.4 D, 525, 446

[56] References Cited

U.S. PATENT DOCUMENTS

| 2,375,068 | 5/1945 | Bennett | 29/456 |
| 2,429,670 | 10/1947 | Crews | 29/127 |
| 2,463,580 | 3/1949 | Warshyk et al. | 29/456 X |
| 3,071,022 | 1/1963 | Strandgren | 29/456 X |
| 3,324,607 | 6/1967 | Niemiec | 29/127 UX |

Primary Examiner—Charlie T. Moon
Attorney, Agent, or Firm—James E. Bryan

[57] ABSTRACT

This invention relates to a method for manufacturing a grooved roller where the grooving is continuous and extends from one rim of the roller to the other, which comprises cutting a groove of slight side angle and in the form of a thread on the periphery of the roller, and then pressing a contoured wire with prestressing into the groove.

9 Claims, 4 Drawing Figures

METHOD FOR MAKING GROOVED ROLLERS FOR DEHYDRATING RUNS OF MATERIALS

This invention relates to a method for making grooved rollers to be used as compression rollers, for the dehydration of runs of materials, the run of material to be dehydrated being guided on a sieve or wire cloth or between two sieves or wire cloths between horizontally supported pairs of rollers, in particular grooved rollers in which the width of the grooves is very small and in which the grooving extends helically from one end of the roller to the other.

The purpose of this method is a simple manufacture of grooved rollers, which otherwise when using cutting methods is difficult to implement and produces few practical results.

It is known to make various surfaces for rollers used in dehydrating equipment. Modifying the known smooth rollers, grooved ones are also known which are obtained by milling or turning a large number of straight grooves in the surface. Again oblique groovings are known, and furthermore intersecting grooves are feasible. A thread of a given pitch is cut in simple manner, both left-handed or right-handed as desired, or both simultaneously.

The purpose of such surface modification is to increase the efficiency of dehydration by removing, as quickly as possible, the water compressed out of the run of material. Perforations also can be used in lieu of grooving to improve dehydration.

However all these compression rollers have the common drawback that their mechanical manufacture entails substantial costs as it is quite difficult to mill or turn relatively narrow grooves. Furthermore, most mechanical methods are eliminated when there is the requirement of groove widths less than one mm.

It has become known as regards achieving narrow groove widths to mount rings and bands on a smooth roller surface so that the surfaces of the rings and bands then form the actual roller surface. These bands may have cross-sections such that they will be closely adjoining in the vicinity of the original roller surface while tapering off at the other end and thus forming a narrow grooving. Such rollers can be particularly easily manufactured when a band with a rising profile is wound on the roller and then made to adhere by using compression rollers.

However, all of these systems have the common drawback that on one hand their mechanical processing is very costly and time-consuming and on the other hand that the mounting of the above-mentioned bands on the rollers fails to result in an intimate bond to the roller surface. This band always rests loosely on the roller and there is the risk that after some time of operation that the band may expand, even if only slightly, whereby it may detach from the roller or at least modify the groove spacing. Overhauling of such a roller requires considerable labor and costs. While such bands might be fastened using conventional elements such as screws etc., their design prevents in this case any efficient assembly.

This being the state of the art, it is the object of the present invention to provide a process for making roller grooves which, while requiring turning threaded grooves on the other hand does essentially and simultaneously simplify the fabrication. It is furthermore the object of the invention to achieve very narrow groove spacings which will be retained even at substantial pressures. This goal is achieved by the invention by cutting, in known manner, threaded grooves with slight side angles and thereafter pressing a contoured wire with prestressing into the threaded grooves. In order to readily assemble the profiled wire with prestressing, the invention in a further implementation provides for forcing the profiled wire into the grooves by means of a pressure pad, the prestressing being obtained after passing through a heating sector and, where appropriate, being reinforced by a decelerating system.

Using this method, it is now possible to manufacture a compression roller in a simple manner, whereby the contoured wire is solidly bound to the roller, so that they form so-to-speak a single machine part. The desired minute width of the grooves is then obtained merely by selection of the wire cross-section.

The invention will be further illustrated by reference to the accompanying drawings, in which.

Figure 1:
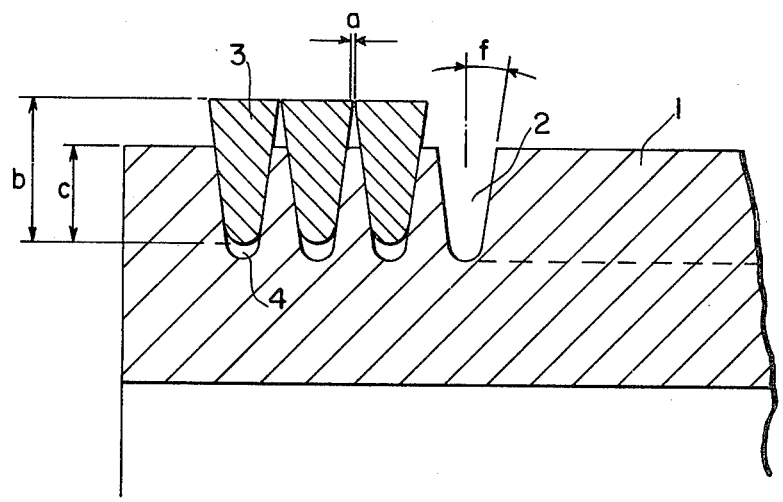
FIG. 1 is a fragmentary view of a longitudinal cross-section of a grooved roller.

As shown by FIG. 1, representing part of a longitudinal cross-section of the roller 1, the threaded grooves 2 are turned into the originally smooth surface of roller 1. These threaded grooves 2 have a conventional pitch for such devices. Their side or included angle f is shallow, the groove depth is c, in addition to which a clearance acts as groove bottom 4 required for a good fit. A contoured wire 3 is inserted in the threaded grooves 2, the wire in the vicinity of the groove depth c assuming the same side or included angle as the thread f. The only essential requirement is that the profiled wire 3 be of such width as to agree with the pitch, in order to obtain the desired gap a at the surface of the finished roller. It is furthermore important that the side angle f fall within the range of self-locking so that the anchoring of the profiled wire 3 occur through wedging.

Figure 2:
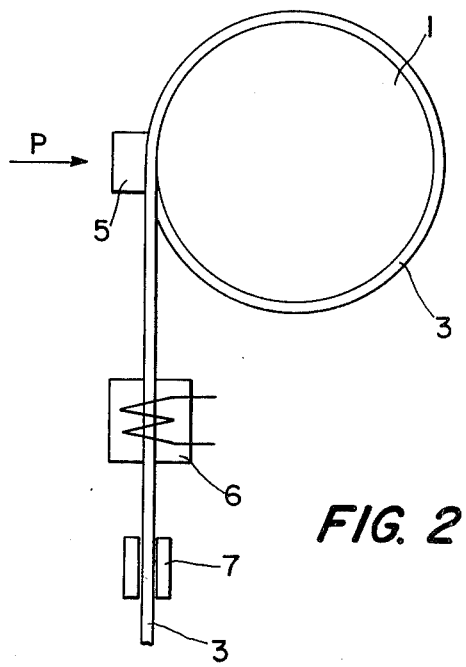
FIG. 2 is a view in elevation of the winding system.

FIG. 2 shows a front view of the roller 1 with the profiled wire 3 being mounted thereon. The wire is wound off of a spool and slowly wound onto the roller 1. A pressure pad 5 applies a certain pressure P on the roller 1 and forces the profiled wire 3 into the roller grooves 2. This profiled wire 3 furthermore is heated along a heating zone 6 in order to achieve prestressing in the form of a change in length due to subsequent cooling. It is furthermore possible to further increase the prestressing by a braking system 7. Once the profiled wire 3 has been placed on the roller 1, that is, once it has reached the end of the grooving, then the end of this wire, as at the beginning of it, is fastened in place using mechanical means.

Figure 3:
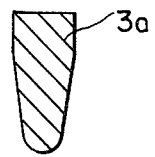
FIGS. 3 and 4 are variations of the profiled wires.
Figure 4:
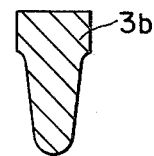

FIGS. 3 and 4 show a variation of the contoured wire in cross-section, the wire 3 as in FIG. 1 being provided with a side corresponding to the included angle f, except that in FIG. 3 the profiled wire 3a while having the same included angle at the location of contact, on the other hand is parallel in its projecting part, whereby a parallel gap is obtained. Accordingly the gap a that remains may be further widened inwardly or else be kept constant.

FIG. 4 shows another variation of the profiled wire 3b which is also provided with the same included angle for assembly but is widened at its exterior. This contoured wire 3b is advantageous for a wide pitch, i.e. grooving, in which case the gap a would otherwise be large. This gap a is advantageously maintained within the range from 0.1 to 0.8 mm. The grooving depth c in the roller surface is ⅔ of the height b of the contoured wire.

This method for making a grooved roller obviously is not restricted to solid rollers only. Perforated rollers also can be used without difficulties. It is immaterial whether the perforations in the roller surface precisely coincide with the gap a. Such perforation can be carried out arbitrarily and the grooving accomplished thereafter. Sufficient perforations remain in the roller surface which, after some distance, come again within the range of the gap a.

In summary, this method is advantageously applicable for a simple manufacture of the grooves in rollers. Especial emphasis is merited by the fact that the contoured wire can be fitted to given pitches of the thread as the desired gap a can be easily maintained by a proper selection of the contoured wire or inversely by the selection of the pitch. It is essential to obtain solid anchoring of the contoured wire to the roller, in order to render impossible any detaching of the contoured wire at any point.

It will be obvious to those skilled in the art that many modifications may be made within the scope of the present invention without departing from the spirit thereof, and the invention includes all such modifications.

What is claimed is:

1. A method for manufacturing a helically grooved roller where the grooving is continuous and extends helically from one rim of the roller to the other, which comprises cutting a helical groove of slight side angle and in the form of a thread on the periphery of the roller, and then pressing a contoured wire with longitudinal prestressing into the groove, said wire having a generally wedge-shaped configuration in the groove and a flat outer periphery.

2. A method for manufacturing a grooved roller according to claim 1 including pressure pad means for pressing said contoured wire into said groove, and heating zone means for prestressing said wire.

3. A method for manufacturing a grooved roller according to claim 2 in which said prestressing is reinforced by a braking means.

4. A method for manufacturing a grooved roller according to claim 1 in which said side angle is in a range whereby said contoured wire is self-locking and anchoring of said wire is effected by wedging.

5. A method for manufacturing a grooved roller according to claim 1 in which a gap between adjacent turns of said contoured wire widens inwardly.

6. A method for manufacturing a grooved roller according to claim 1 in which a gap between adjacent turns of said contoured wire is constant.

7. A method for manufacturing a grooved roller according to claim 1 in which said groove has a depth equal to about ⅔ of the elevation of said contoured wire.

8. A method for manufacturing a grooved roller according to claim 1 in which said roller has a continuous surface.

9. A method for manufacturing a grooved roller according to claim 1 in which said roller has a perforated surface.

* * * * *